United States Patent
Dalgord et al.

[19]

[11] Patent Number: 6,142,862
[45] Date of Patent: Nov. 7, 2000

[54] DE-BONING APPARATUS AND METHOD

[75] Inventors: Lonnie Joe Dalgord, Green Bay; Eric Orville Evenson, Greenleaf, both of Wis.

[73] Assignee: Genesis Custom Machinery, Inc., Green Bay, Wis.

[21] Appl. No.: 09/298,721

[22] Filed: Apr. 23, 1999

[51] Int. Cl.⁷ ..................................................... A22C 25/16
[52] U.S. Cl. .......................................... 452/137; 452/127
[58] Field of Search ..................................... 452/135, 127

[56] References Cited

U.S. PATENT DOCUMENTS

| | | |
|---|---|---|
| 2,149,022 | 2/1939 | Hunt . |
| 2,424,057 | 7/1947 | Savrda . |
| 2,552,984 | 5/1951 | Leuschner . |
| 4,008,509 | 2/1977 | Braeger et al. . |
| 4,236,275 | 12/1980 | Westerdahl . |
| 4,484,375 | 11/1984 | Brower . |
| 4,602,404 | 7/1986 | Betnar . |
| 4,748,723 | 6/1988 | Braeger et al. . |
| 4,771,511 | 9/1988 | Weyand . |
| 5,067,926 | 11/1991 | Richburg . |
| 5,306,202 | 4/1994 | Meeker . |
| 5,338,250 | 8/1994 | Swilley et al. . |
| 5,525,101 | 6/1996 | Söderlind . |
| 5,904,616 | 5/1999 | Larsen ...................................... 452/135 |
| 5,911,621 | 6/1999 | Durst et al. ............................. 452/135 |

*Primary Examiner*—Willis Little
*Attorney, Agent, or Firm*—Michael Best & Friedrich LLP

[57] ABSTRACT

A de-boning apparatus and method for removing bones and other undesirable elements from meat. The apparatus preferably includes a conveyor assembly conveying meat to and from a head assembly which removes the bones, one or more rail assemblies located beside the conveyor assembly for keeping meat on the conveyor assembly as it passes through the apparatus, a conveyor drive system for powering the conveyor assembly, and a head drive assembly for powering the head assembly. The conveyor assembly preferably has a conveyor drum and an idler wheel about which a conveyor belt runs. The conveyor belt conveys meat to the head assembly preferably located beside the conveyor drum at a point when the conveyed meat is bowed as it passes around the conveyor drum, thereby better exposing bones for removal. The head assembly preferably includes a pin bone wheel (driven by the head drive system) and a head block spaced from the pin bone wheel to define a gap therebetween. As meat is conveyed past the gap while the pin bone wheel is rotated, bones protruding from the meat are caught in the gap entrance and are subsequently pulled from the meat. The gap entrance width, the distance of the gap entrance from the conveyor belt, and the angle of attack of the gap entrance are all preferably adjustable. The rail assemblies are also preferably adjustable to accommodate different sizes of meat, and are most preferably movable under a spring bias to accept various meat sizes passing through the apparatus.

43 Claims, 11 Drawing Sheets

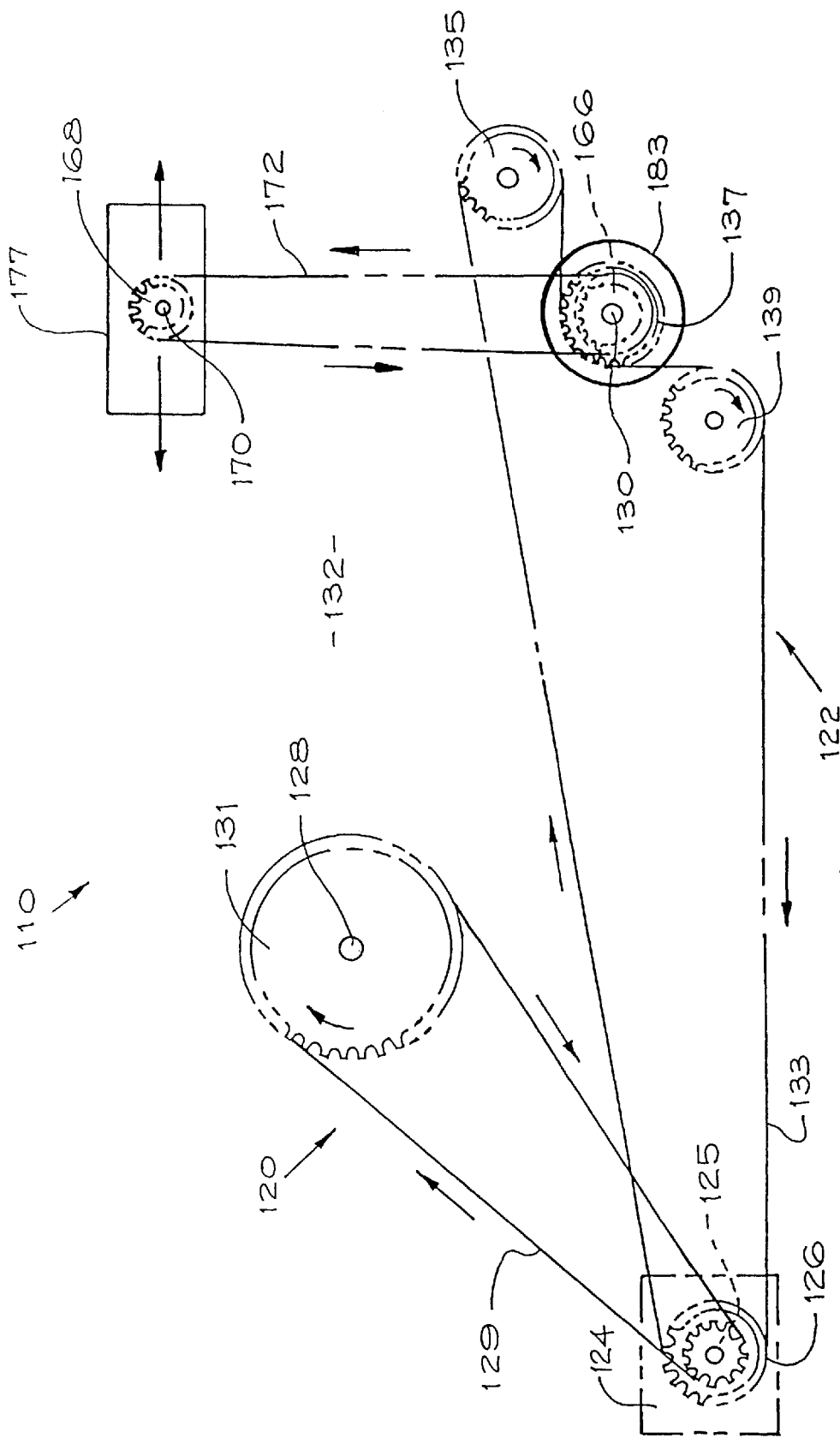

DE-BONING APPARATUS AND METHOD

FIELD OF THE INVENTION

The present invention relates to de-boning systems, and more particularly, to a system and method for removing bones (and particularly, pin bones) from fish.

BACKGROUND OF THE INVENTION

A common problem in the processing of meat is the difficulty inherent in removing bones from the meat. Although this difficulty manifests itself in the processing of many meat types such as fish, poultry, beef, and the like, and in the removal of many different types of bones and similar objects such as pin bones, ribs, quills, etc., removal of certain bones from certain types of meat is particularly difficult. For example, the removal of pin bones from fish is unusually troublesome. Pin bones are typically rather fine and delicate, and are susceptible to fracture upon their removal. The small and fragile nature of pin bones, coupled with the fact that pin bones are often numerous and commonly protrude less than a millimeter above the surface of a fish, result in a challenging bone removal problem. A number of bone removal devices have been developed which attempt to solve this problem and do so with mixed success.

Most devices which remove pin bones from fish utilize one or more blades to do so. For obvious reasons, devices employing blades present an inherent risk to those around and operating such devices. Another important design factor for pin bone removing devices is the amount of meat removed during the pin bone removal process. In this regard, a problem arises with conventional devices: pin bone removing devices which are very effective at removing pin bones often remove and waste a large amount of meat in the pin bone removal process, while pin bone removing devices which are careful to conserve meat often have limited pin bone removal effectiveness.

An obvious design preference in pin bone removal devices is the speed at which such devices operate. Unfortunately, however conventional pin bone removal devices are typically either slow and thorough or fast and sloppy. This is often the result of design problems common to many existing pin bone removal devices. For example, some devices use one or more elements to pinch and then pull the ends of pin bones which extend beyond the surface of the fish. Such devices by their nature require some degree of exposed pin bone to remove the pin bone. However, some devices have one or more parts which press down upon the fish and pin bone therein prior to the pin bone extraction process, thereby making access to the pin bones that much more difficult. In all such devices, however, the mechanical elements which are used to grip and pull the pin bones often either do not have enough exposed pin bone to grip, in which case the pin bone remains within the fish, or must be pressed into the meat to grip the pin bone, thereby also removing and wasting a significant amount of meat in the process.

Finally, another concern in the design of pin bone removing devices and systems is the weight of such devices and systems and their ability to be cleaned. Weight often becomes an important consideration for pin bone removing devices which are meant to be portable and/or handheld. As such, complex pin bone removing devices and systems employing numerous elements are undesirable—from both a weight and a cost standpoint. Unfortunately, many existing devices for pin bone removal do not take into consideration weight or the ability to clean such devices.

Therefore, a need exists for a fast and thorough pin bone removal device and method which does not use blades for the sake of safety, does not result in the waste of significant amounts of meat in the pin bone removal process, works well with very limited pin bone exposure, removes pin bones without pin bone breakage, is relatively lightweight, is simple in design and operation, and has a design permitting the device to be easily cleaned. Each embodiment of the present invention achieves one or more of these results.

SUMMARY OF THE INVENTION

The present invention is an apparatus and method for removing bones and other undesired elements (quills, feathers, etc.) from meat. To accomplish this task, the present invention preferably employs a conveyor assembly driven by a conveyor drive system, a head assembly driven by a head drive system, and one or more rail assemblies.

In a preferred embodiment of the present invention, the conveyor assembly includes a conveyor drum rotated about and driven by a drive shaft, which itself is powered by a motor. A conveyor belt is preferably run about the conveyor drum and is kept under proper tension by an adjustable idler wheel. The conveyor belt conveys the meat which is to be de-boned towards the head assembly. The head assembly preferably includes a pin bone wheel and head block, both of which are preferably secured to a head shaft for pivotal rotation about the head shaft. The pin bone wheel and head block are separated by a gap which has an entrance facing the conveyor belt. When meat is conveyed to the head assembly, the meat is run beside the gap entrance. Rotation of the pin bone wheel causes bones which protrude from the surface of the meat to be caught in the gap entrance (gripped between the pin bone wheel and the head block). Further movement of the conveyor belt and/or rotation of the pin bone wheel causes the bones to be pulled from the meat. The meat is then conveyed past the head assembly and out of the apparatus.

Due to the fact that bones in a number of meats are better exposed when the meat is bowed, it is preferred to locate the head assembly at a position in the apparatus which is along a curved path of the conveyor belt. To this end, the preferred location of the head unit is beside the conveyor belt as it passes around the conveyor drum. The curved shape of meat held against the conveyor belt as it passes around the conveyor drum causes bones in the meat to protrude therefrom and be better exposed to the gap entrance.

Preferably, the pin bone wheel has a number of teeth spaced by gaps to better catch and grip bones protruding from passing meat. In this connection, it is preferred that the gap, and particularly the gap entrance between the pin bone wheel and the head block is adjustable for catching and gripping different bone sizes. The adjustment preferably can be made either by loosening fasteners which connect the head block to the head unit and shifting the location of the head block on the head unit, or by providing on the pin bone wheel pivot shaft an eccentric bearing adjuster which can be rotated to move the pin bone wheel position on the head unit. The teeth of the pin bone wheel are preferably provided with a number of longitudinal channels or grooves running along the surface thereof. These channels act to more securely grip the bones in order to pull them from the passing meat.

The angle of attack (i.e., the angle at which the gap entrance meets passing meat on the conveyor belt) can be important for certain bone removal operations. Therefore, it is also preferable that the orientation of the head block and pin bone wheel is adjustable with respect to the conveyor belt. To accomplish this, the head assembly is pivotably mounted on the head shaft as mentioned above. To drive the pin bone wheel, the system motor is used to drive the head shaft, which itself preferably drives the pin bone wheel via a sprocket and chain assembly. Although the head assembly is attached to the head shaft as just mentioned, it is rotatably attached thereto to permit the head shaft to turn without turning the head assembly. For further adjustability, the head block and the pin bone wheel can also be mounted on plates which are assembled together using fasteners passed through slotted holes. Preferably, the torque exerted upon the head assembly during pin bone removal causes the head assembly to pivot about the head shaft to press against the meat as it is conveyed past the head assembly.

In a preferred arrangement for the conveyor drive system and the head drive system, both systems are run from the same motor, with the driven speeds of each system being different through speed changing sprocket and chain assemblies. The conveyor drive system can be provided with a clutch which is controlled by a switch located beside the head assembly. The switch senses the presence of meat approaching and leaving the head assembly, and engages to drive the head shaft and the pin bone wheel only at certain times during the operation of the apparatus. For example, particularly in the removal of pin bones from fish, it is highly preferred that the pin bone wheel is not turned by the head drive system when the tail of the meat is passing the head assembly.

Finally, the apparatus preferably includes one or more rail assemblies which are located beside the conveyor belt to hold the meat to the conveyor belt while the meat is being conveyed to and from the head assembly. The rail assemblies preferably include one or more rails whose distance from the surface of the conveyor belt is adjustable to accommodate different sizes of meat being passed through the apparatus. Most preferably, the rails can pivot to accommodate different sizes of meat passing beneath the rails, and are biased by springs or other biasing elements to return to a rest position beside the conveyor belt when no meat is present between the rails and the conveyor belt.

More information and a better understanding of the present invention can be achieved by reference to the following drawings and detailed description.

BRIEF DESCRIPTION OF THE DRAWINGS

The present invention is further described with reference to the accompanying drawings which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts:

FIG. 7b is an assembled perspective view of the head assembly of the alternative preferred embodiment illustrated in FIG. 7a;

FIG. 9 is an elevational view of the driving side of the alternative preferred embodiment illustrated in FIGS. 7a, 7b and 8.

DETAILED DESCRIPTION OF PREFERRED EMBODIMENTS

Figure 1:
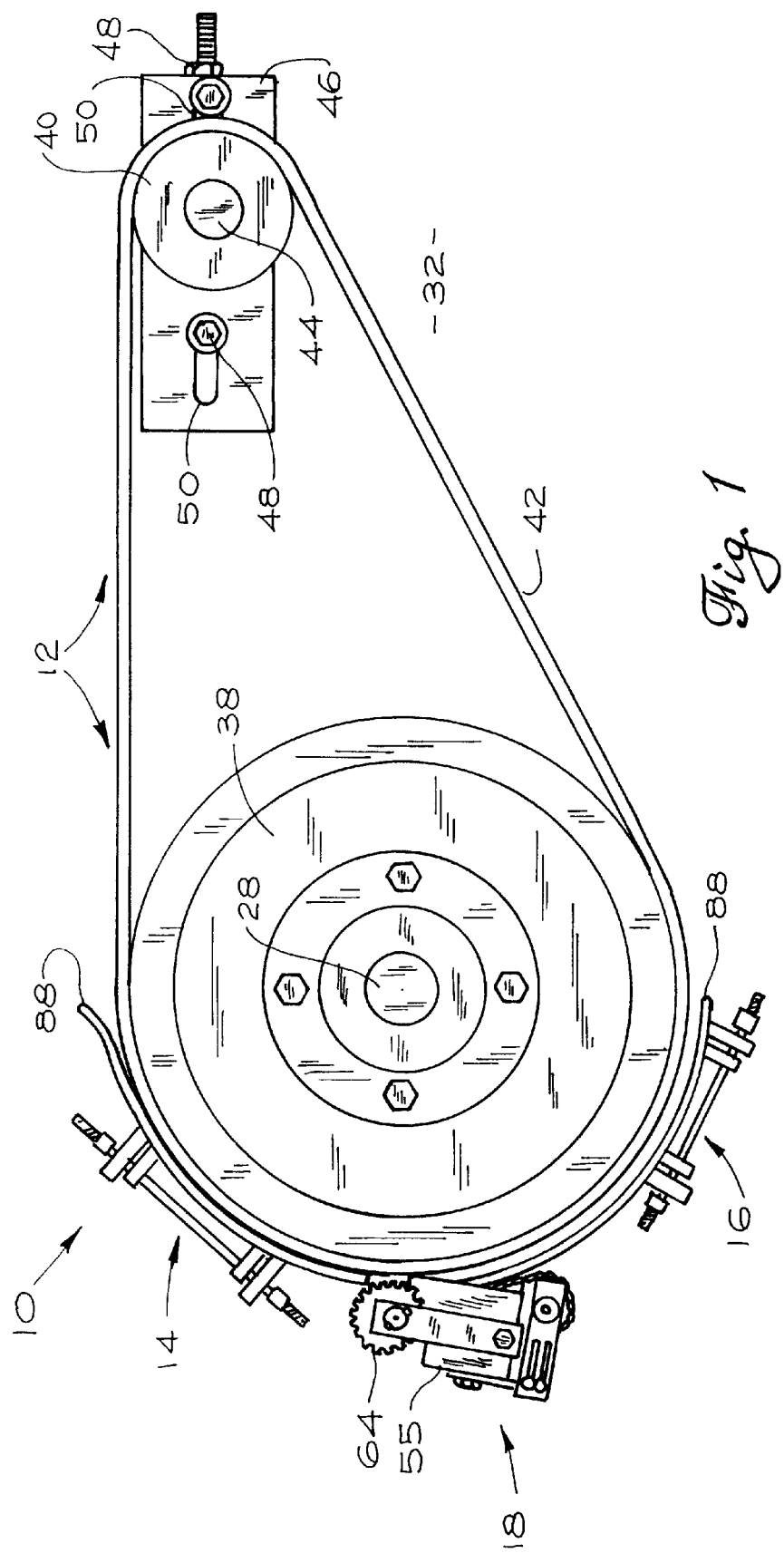
FIG. 1 is an elevational view of the driven side of the de-boning apparatus according to a preferred embodiment of the present invention.
Figure 2:
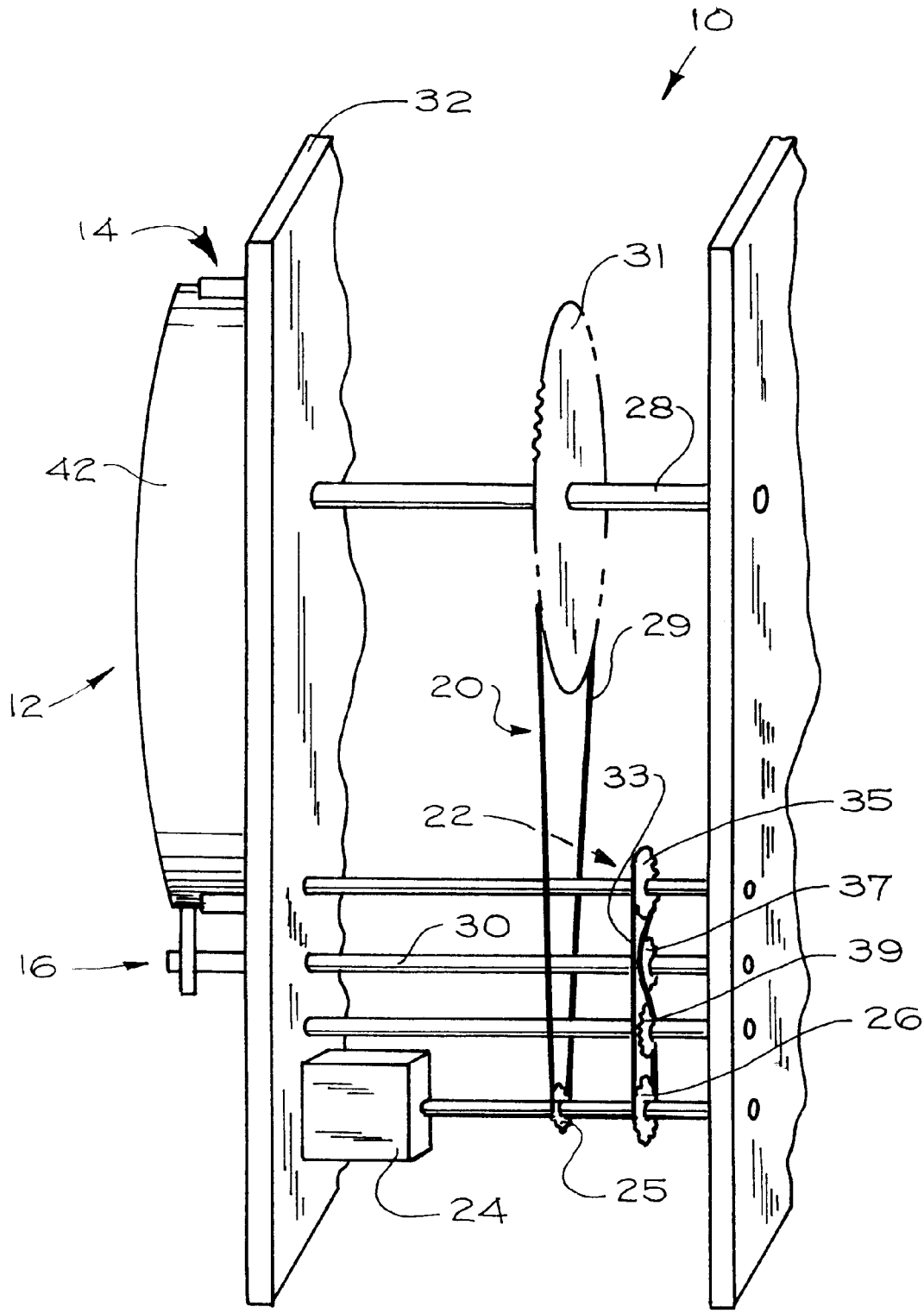
FIG. 2 is an elevational view, taken at a slight angle, of the front of the preferred embodiment illustrated in FIG. 1.
Figure 3:
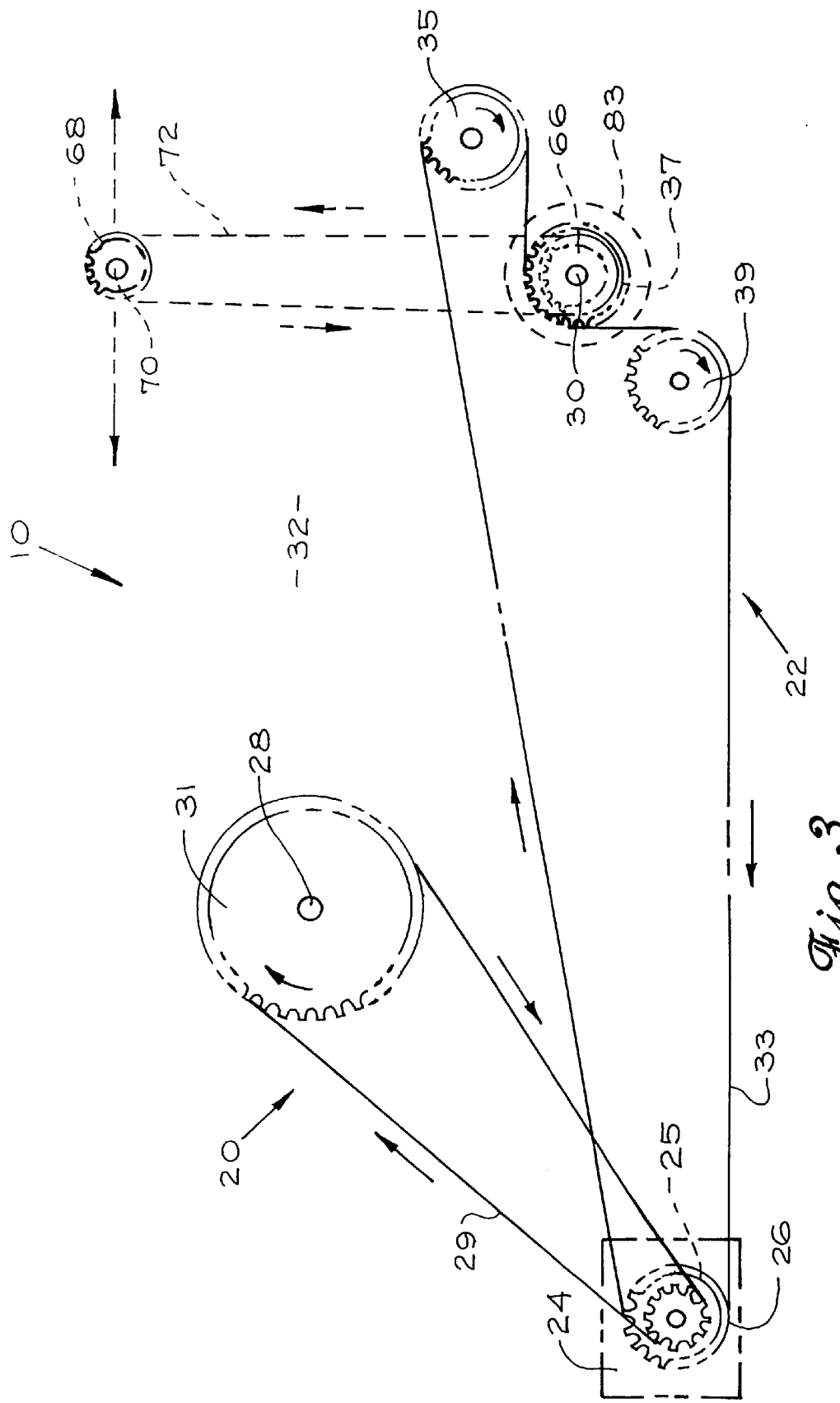
FIG. 3 is an elevational view of the driving side of the preferred embodiment illustrated in FIGS. 1 and 2.

As can best be seen with reference to FIGS. 1–3, a preferred embodiment of the de-boning apparatus according to the present invention (indicated generally at 10) includes a conveyor assembly 12, upper and lower rail assemblies 14, 16, a head assembly 18, a conveyor drive system 20, and a head drive system 22. The conveyor drive system 20 drives the conveyor assembly 12, while the head drive system 22 drives the head assembly 18. The conveyor drive system 20 and the head drive system 22 are preferably driven at different speeds through chains and sprockets by the same motor 24.

With particular reference to FIGS. 2 and 3, the shaft of the motor 24 is preferably provided with two sprockets 25, 26 which drive the conveyor drive system 20 and the head drive system 22, respectively. The conveyor drive sprocket 25 drives a conveyor drive chain 29 which turns a large sprocket 31 connected in a conventional fashion to a conveyor drive shaft 28. The conveyor drive shaft 28 is connected to the conveyor assembly 12 in a manner described below. The head drive sprocket 26 drives a head drive chain 33 which is driven over an idler sprocket 35, over a second head drive sprocket 37 and over a second idler sprocket 39. The second head drive sprocket 37 drives a head drive shaft 30 and the head assembly 18 as described in more detail below. To ensure a stable relationship between the conveyor assembly 12, the head assembly 18, and their respective drive systems 20, 22, the de-boning apparatus 10 is preferably mounted to a frame plate 32. Specifically, the motor 24 is preferably mounted in a conventional manner directly to or beside the frame plate 32, with the shafts supporting the large sprocket 31, idler sprockets 35, 39, and second head drive sprocket 37 being supported therein via bearings. The frame plate 32 can be any rigid structure capable of holding the components of the de-boning apparatus 10 securely relative to each other, and can be made of a number of materials such as metal, wood, stone, concrete, glass, ceramics, composites, fiberglass, plastics, or combinations thereof It will be appreciated that the particular drive systems 20, 22 described above can be replaced by any number of drive systems having significantly different elements and configurations well known to those skilled in the art. For example, it is possible to have the conveyor drive shaft 28 and the head drive shaft 30 directly driven and controlled by separate motors turning at different speeds (through gear reducers or other conventional speed changing equipment). Also, though the chain and sprocket assemblies are preferred, such assemblies can be replaced by belt and pulley systems, gear systems, or other power transmission assemblies and devices for turning the conveyor drive shaft 28 and the head drive shaft 30. Motor types can include electrical, water, reciprocating, or a number of other power generating devices well-known to those skilled in the art.

With reference still to FIGS. 1–3, it can be seen that the conveyor assembly 12 includes a conveyor drum 38 mounted in a conventional fashion to the conveyor drive shaft 28, an idler wheel 40, and a conveyor belt 42 passed around both the conveyor drum 38 and the idler wheel 40. The conveyor drum 38, the idler wheel 40, and the conveyor belt 42 can be made of any number of materials (e.g., metal, wood, stone, glass, ceramics, composites, fiberglass, plastics, or combinations thereof). However, the conveyor drum 38 and the idler wheel 40 are preferably made from a low-slip low-wear engineered plastic. Alternately, the outer surface of the conveyor drum 38 and the idler wheel 40 can be lined or coated with such material. The conveyor belt 42 is preferably also made from, lined with, or coated with a low-slip material such as rubber, urethane, plastic, etc. which preferably can be easily cleaned. Preferably, the conveyor belt 42 has an uneven surface with knurls, ribs, or bumps for better gripping meat conveyed thereon. The idler wheel 40 is rotatably mounted to the frame plate 32 in a conventional manner via an idler wheel shaft 44. Suitable clearance can be provided between the frame plate 32 and the conveyor drum 38 and the idler wheel 40 in a number of different ways (e.g., by appropriately selected bearings or spacers (not shown), etc.) which are also well-known to those skilled in the art. In a most preferred embodiment of the present invention, the idler wheel 40 is attached to an adjustment plate 46 in a conventional manner (e.g., by welding, bolting, riveting, etc.), and the adjustment plate 46 is itself mounted to the frame plate 32 via bolts 48 passing through holes 50 in the adjustment plate 46 and the frame plate 32. The holes 50 in the frame plate 32 and/or the adjustment plate 46 are preferably slotted to permit the adjustment plate 46, the idler wheel shaft 44, and the idler wheel 40 to be mounted to the frame plate 32 in a range of positions of varying distance from the conveyor drum 38 and the conveyor drive shaft 28. It should be noted that the holes 50 in the frame plate 32 can be threaded to receive the bolts 48. Alternately, the holes 50 in the frame plate can be through holes, in which case the bolts 48 are preferably secured in the frame plate 32 via nuts (not shown) on the opposite side of the frame plate 32. By loosening the bolts 48 holding the adjustment plate 46 in place on the frame plate 32, the adjustment plate 46, idler wheel shaft 44, and idler wheel 40 can be shifted in the slotted holes 50 to a different location on the frame plate 32, thereby adjusting the tension on the conveyor belt 42 as desired.

Of course, the idler wheel 40 and the conveyor belt tension need not necessarily be adjustable as just described. The idler wheel 40 can in fact be fixed in only one position on the frame plate 32, and can even be permanently fixed in place (e.g., by welding, riveting, gluing, etc.) if desired.

As shown in FIG. 1 and as mentioned above, the conveyor belt 42 also passes around the conveyor drum 38. The tension on the conveyor belt 42 around the conveyor drum 38 and the idler wheel 40 is preferably sufficient to permit the conveyor drum 38 to be turned (via the conveyor drive shaft 28 and the motor 24) and to thereby turn the idler wheel 40 without conveyor belt slippage.

Figure 4:
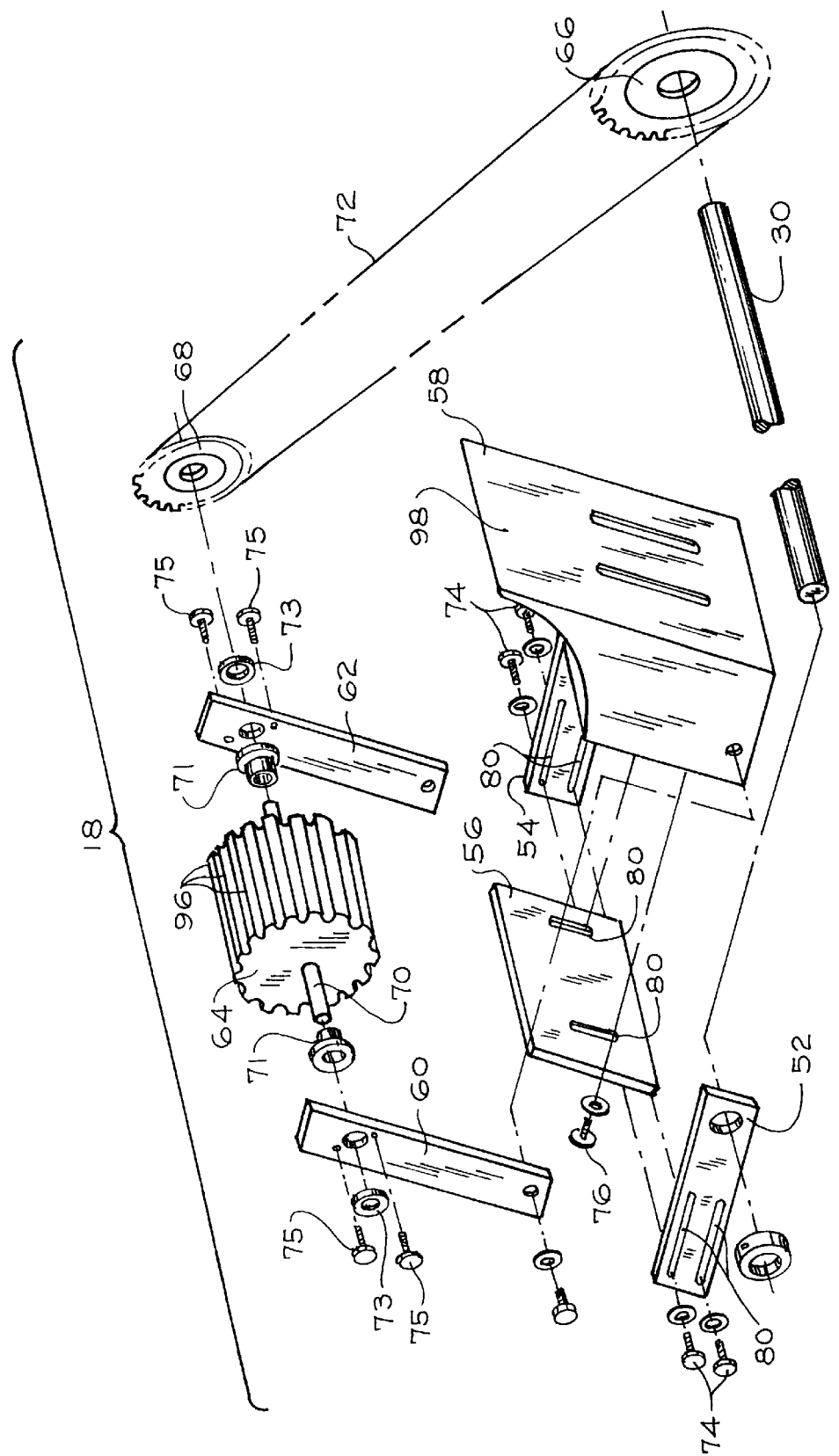
FIG. 4 is an exploded perspective view of the head assembly of the preferred embodiment illustrated in FIGS. 1–3.
Figure 5:
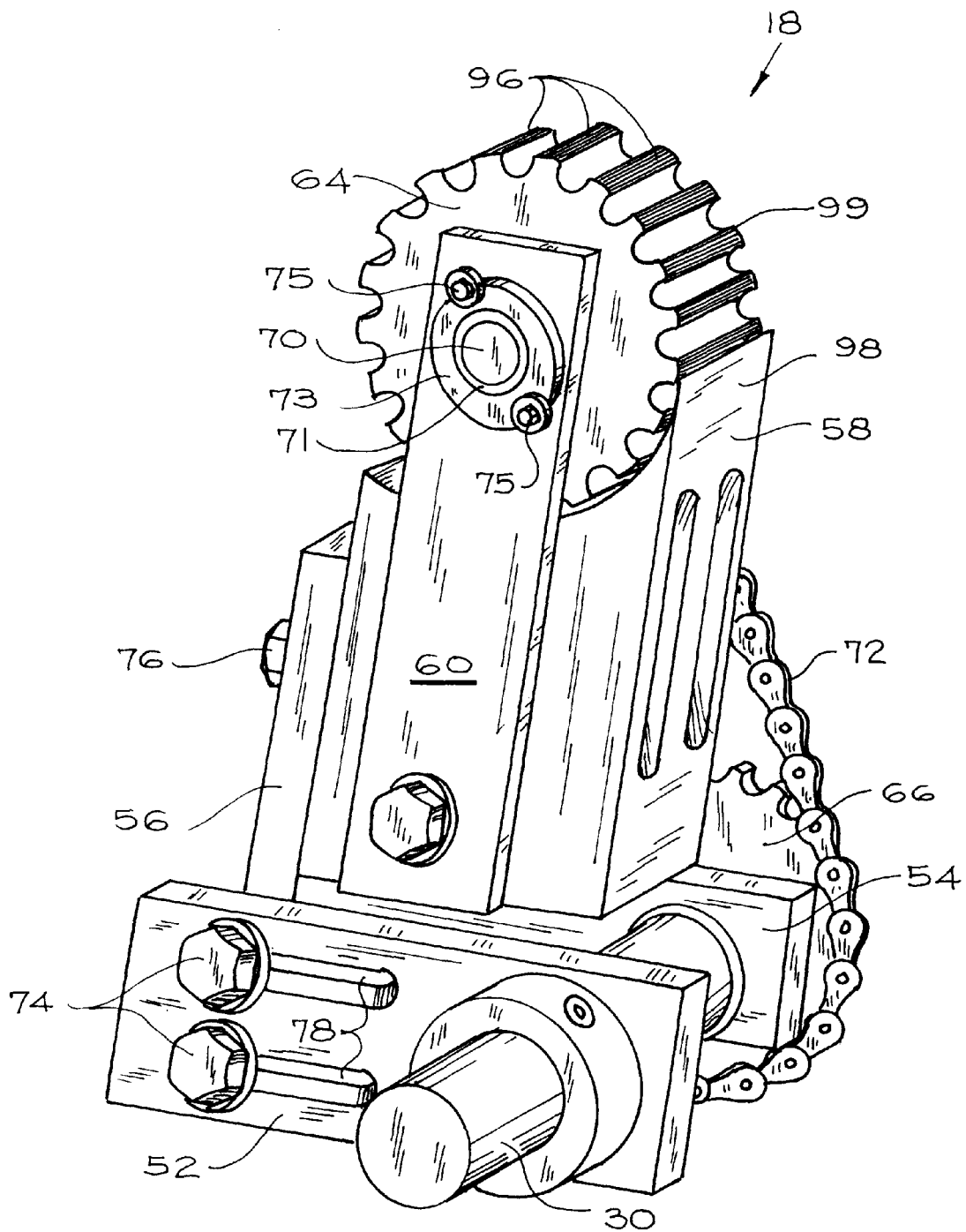
FIG. 5 is an assembled perspective view of the head assembly of the preferred embodiment illustrated in FIGS. 1–4.

Turning next to FIGS. 4 and 5, the head assembly 18 of the present invention will now be described. First, it can be seen from FIGS. 1–3 that the head drive shaft 30 passes through the frame plate 32. On the end of the head drive shaft 30 are preferably mounted three elements: a head drive shaft sprocket 66 which is fixed in a conventional manner to the head drive shaft 30 and which turns therewith, and two side adjustment plates 52, 54 which are mounted in a conventional manner to the head drive shaft 30 so that they can rotate with respect thereto. The two side adjustment plates 52, 54 preferably secure the head assembly 18 to the head drive shaft 30 so that the head assembly is not only powered by the head drive shaft 30 via the head drive shaft sprocket 66, but is also supported and can pivot about the head drive shaft 30 to swing the head assembly 18 (and more particularly, the head block 58 and the pin bone wheel 64 described below) toward or away from the conveyor assembly 12. For supporting and holding the head block 58, the two side adjustment plates 52, 54 are preferably attached to either side of a backplate 56, which itself is attached to the head block 58. Preferably, the pin bone wheel 64 is rotatably attached to and is supported by the head block 58 via two pin bone wheel arms 60, 62 which are each secured to opposite sides of the head block 58. The pin bone wheel 64 rotates about a pin bone wheel pivot 70, which is also secured between the two pin bone wheel arms 60, 62. As mentioned above, the subassembly consisting of the side adjustment plates 52, 54, the backplate 56, the head block 58, the pin bone wheel arms 60, 62, the pin bone wheel pivot 70, and the pin bone wheel 64 is preferably mounted to rotate with respect to the head drive shaft 30. To power the pin bone wheel 64, the head drive shaft sprocket 66 (see FIGS. 4 and 5) which is rigidly secured to the head drive shaft 30 preferably drives a pin bone wheel sprocket 68 which is attached to the pin bone wheel pivot 70 in a conventional fashion. In this regard, a head assembly chain 72 (see FIGS. 3–5) is passed around and engages the teeth of both the head drive shaft sprocket 66 and the pin bone wheel sprocket 68. Therefore and preferably, as the head drive shaft 30 is turned by the motor 24 through the head drive system 22, the head drive shaft sprocket 66, head assembly chain 72, and pin bone wheel sprocket 68 turn the pin bone wheel 64, while the head block 58 and the pin bone wheel 64 can be pivoted toward or away from the conveyor assembly 12.

As will be discussed below, an important operational feature of the present invention is the physical relationship between the conveyor belt 42, the pin bone wheel 64, and the head block 58. Due to the importance of this relationship, it is preferred that a user can adjust the physical relationship between these three elements. Specifically, the angle at which the head block 58 is directed toward the conveyor belt 42, the location at which the head block 58 is closest to the conveyor belt 42 in its pivot motion, and the location and spacing of the pin bone wheel 64 with respect to the head block 58 and the conveyor belt 42 can all be altered by providing for adjustability between the side adjustment plates 52, 54, the backplate 56, and the head block 58. One manner of adjustment is illustrated in the figures, in which bolts 74 securing the side adjustment plates 52, 54 to the backplate 56 and bolts 76 securing the backplate 56 to the head block 58 can be secured in a range of positions. In particular, the side adjustment plates 52, 54 preferably have slotted holes 78 therein to permit a range of attachment relationships of the side adjustment plates 52, 54 to the backplate 56. Similarly, the backplate 56 preferably has slotted holes 80 therein to permit a range of attachment relationships of the backplate 56 to the head block 58. By loosening the bolts 74, 76 and shifting the side adjustment plates 52, 54, backplate 56, and head block 58 with respect to one another, a number of different head assembly orientations can be achieved. This provides for wide adjustment of the head block 58 and the pin bone wheel 64 with respect to the conveyor belt 42, as mentioned above.

To provide for further adjustability between the pin bone wheel 64 and the head block 58, the pin bone wheel is preferably mounted to the pin bone wheel arms 60, 62 via eccentric bearing adjusters 71. Specifically, while the pin bone wheel 64 is preferably rigidly attached to the pin bone wheel pivot 70 (e.g., via a press or interference fit, etc.), the pin bone wheel pivot 70 itself is preferably mounted within conventional bearings (not shown) which are preferably mounted within the eccentric bearing adjusters 71. The eccentric bearing adjusters 71 are each essentially a washer or donut-shaped element having an off-center hole and a flange extending into a mating hole in the pin bone wheel arms 60, 62. By turning the eccentric bearing adjusters 71 when they are mounted upon the bearings and the pin bone wheel pivot 70, the pin bone wheel pivot 70 and pin bone wheel 64 moves with respect to the head block 58. This adjustability permits a change to be made in the gap between the pin bone wheel 64 and the head block 58. After the desired rotational position is found for the eccentric bearing adjuster 71, it can be secured into its rotational position in a number of conventional manners, such as by washers 73 carried upon bolts 75 passed into the pin bone wheel arms 60, 62 beside the eccentric bearing adjusters 71. Alternately, the fit of the flange of the eccentric bearing adjuster 71 in the pin bone wheel arms 60, 62 can be a light interference fit so that the eccentric bearing adjuster 71 will not rotate without a significant torque from a tool.

It should be noted that although bolts are shown in the figures and described above as securing the side adjustment plates 52, 54 to the backplate 56, the backplate 56 to the head block 58, and the head block 58 to the pin bone wheel arms 60, 62, many other fasteners and fastening methods are possible. For example, one or more of the bolts described and illustrated can be replaced by screws, nails, welds, glue, rivets, cotter pins, etc. Since a more permanent attachment method (such as welding) dictates a single-body construction between two or more of the elements just described, it is possible to form any two of these elements together into one. However, the embodiment and manner of attachment described above and illustrated in the figures permits adjustability between the side adjustment plates 52, 54, the backplate 56, and the head block 58, and permits the head assembly 18 to be disassembled (e.g., for replacing a worn head block 58, etc.).

Figure 6:
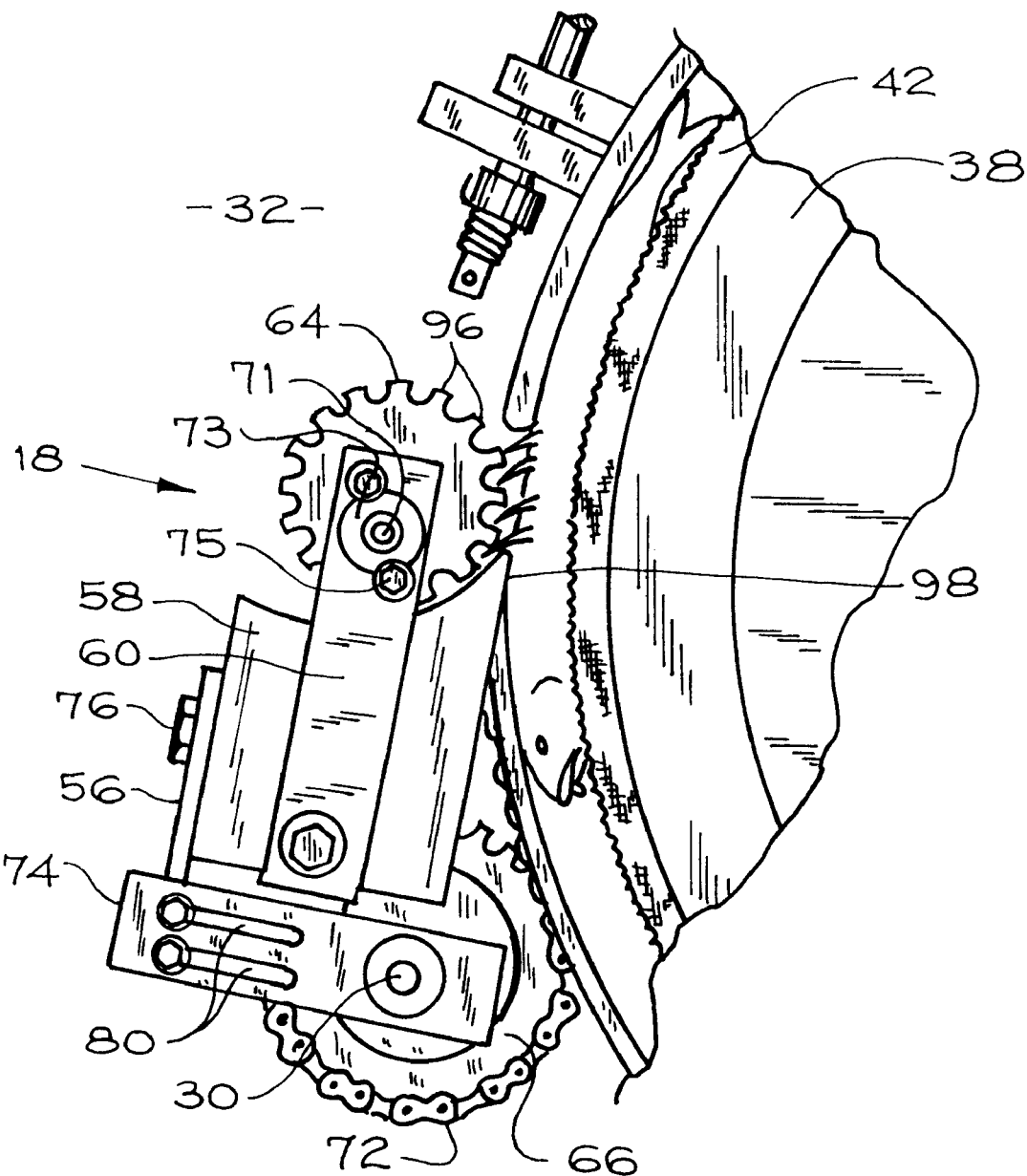
FIG. 6 is an detail elevational of the head assembly area of the preferred embodiment illustrated in FIGS. 1–5, showing the present invention in operation.
Figure 7A:
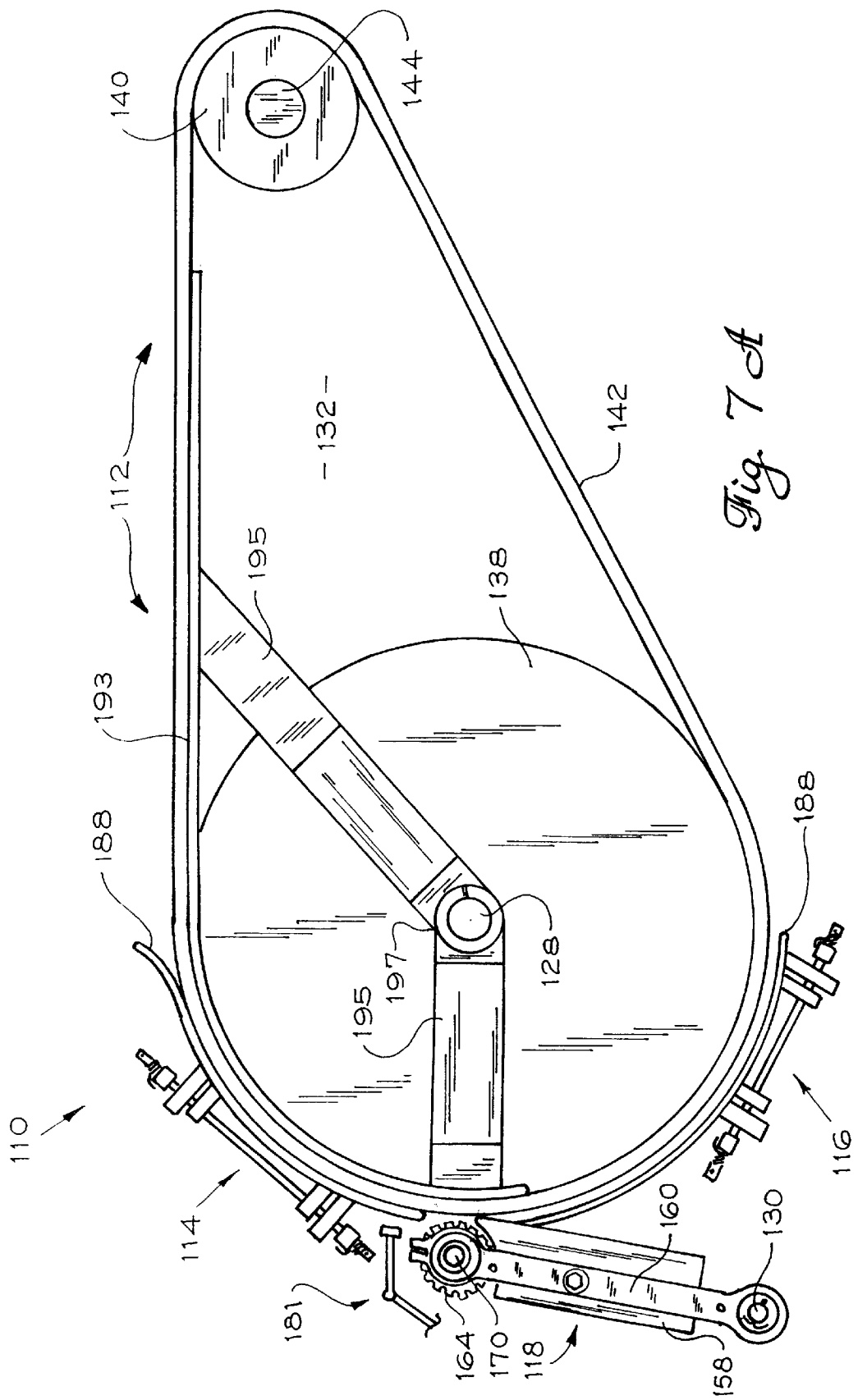
FIG. 7a is an elevational view of an alternative preferred embodiment of the de-boning apparatus of the present invention.
Figure 7B:
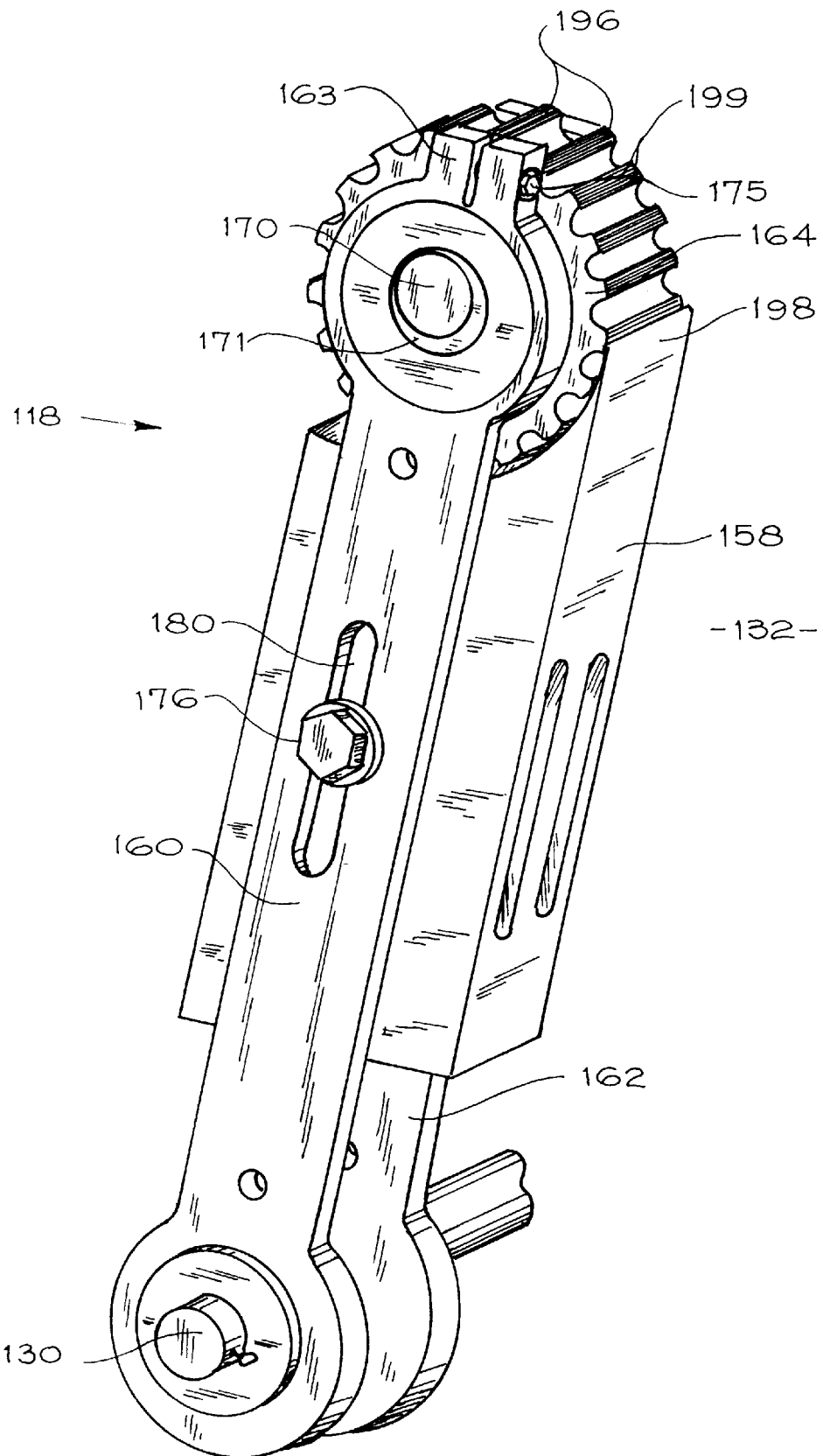

An example of a more simplified embodiment of the head assembly 58 described above and illustrated in FIGS. 1, 4, and 5 is shown in FIGS. 7a and 7b. Although this alternative embodiment provides for slightly less adjustability than the head assembly 58 of FIGS. 1–6 (note that fasteners such as bolts 74, 76 and slotted holes 78, 80 are not employed), this alternative embodiment is highly preferred due to its simplicity, ease of adjustability, and maintenance. Elements of the alternative assembly which correspond to elements in the embodiment described above are prefixed by a number (1).

As can be seen in FIGS. 7a and 7b, the side adjustment plates 52, 54, backplate 56, and pin bone wheel arms 60, 62 are replaced by a pair of pin bone wheel arms 160, 162 flanking the head block 158 and attached thereto via bolts 176 passed through slotted holes 180 within the pin bone wheel arms 160, 162 (for adjustability) and into the head block 158. It will be noted that the head assembly 158 is somewhat longer than the head assembly 58 of the first preferred embodiment described above. This provides the advantage that movement of the pin bone wheel 164 and the head block 158 during machine operation is more stable. When meat passes beside the head assembly 118 to pivot the head assembly 118 about the head drive shaft 130, the longer head assembly 118 does not pivot through as wide an angle as the first preferred embodiment described above. The pin bone wheel arms 160, 162 are preferably pivotably attached at one end for rotation about the head drive shaft 130. At an opposite end, each of the pin bone wheel arms 160, 162 preferably has a clamp fitting 163 which fits over the eccentric bearing adjuster 171 to clamp it in place over the eccentric bearing adjusters 171 and over the bearings (not shown) on the pin bone wheel pivot 170. The eccentric bearing adjusters 171 can be rotated for adjustment of the pin bone wheel 164 as described above by loosening the clamp fasteners 175 on the ends of the pin bone wheel arms 160, 162 and by rotating the eccentric bearing adjusters 171.

Figure 8:
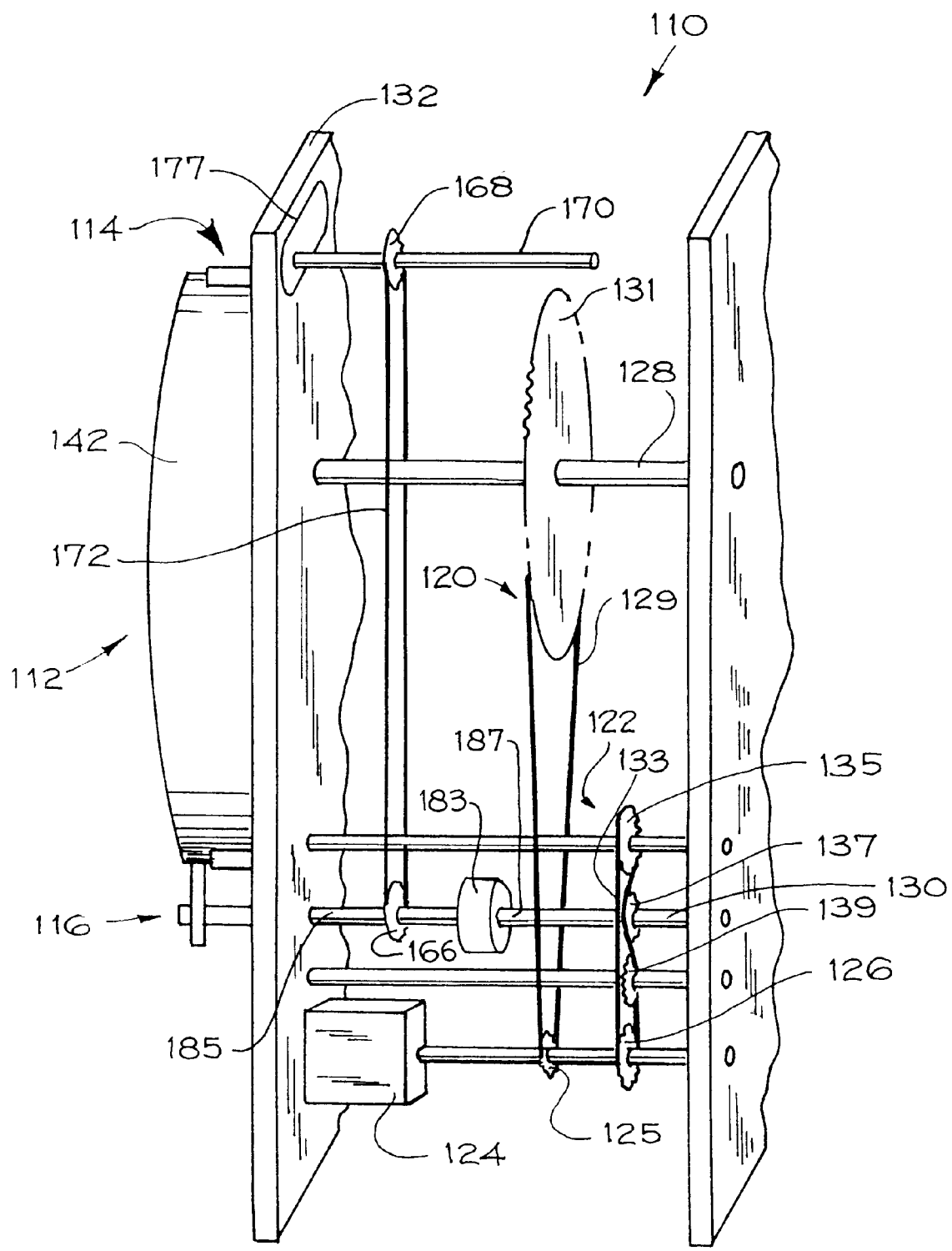
FIG. 8 is an elevational view, taken at a slight angle, of the front of the alternative preferred embodiment illustrated in FIGS. 7a and 7b.

In the preferred embodiment of the present invention illustrated in FIGS. 7a, 7b, 8 and 9, the head drive shaft sprocket 166, head assembly chain 172, and the pin bone wheel sprocket 168 are all located behind the frame plate 132. This ensures that these elements are separated from the meat processing area in front of the frame plate 132, and provides for a more easily cleanable and sanitary apparatus 110. The pin bone wheel pivot 170 therefore passes through a slotted hole 177 in the frame plate 132. The slotted hole can be covered in a conventional manner by a plate or shroud (not shown) to prevent passage of fluids or matter through the slotted hole 177. As shown in FIGS. 8 and 9, the pin bone wheel sprocket 168 is preferably mounted on the pin bone wheel pivot 170 and is driven by the head assembly chain 172 which passes around the head drive shaft sprocket 166 also located behind the frame plate 132. It will be appreciated that the head drive shaft sprocket 166, head assembly chain 172, and the pin bone wheel sprocket 168 can be connected to drive together in a number of other manners, such as via a belt and pulley or gear arrangement. Such alternative arrangements fall within the spirit and scope of the present invention.

To address a problem which can arise in the processing of certain types of meat (and in particular, fish), the embodiment of the present invention illustrated in FIGS. 7a, 7b, 8 and 9 is provided with a clutch and switch system. Specifically, it is possible that fish which are passed head first through the apparatus 110 can have their tails trapped between the pin bone wheel 164 and the head block 158, much the same way that the pin bones pulled from the fish are trapped. This can cause a jam in the apparatus, as the fish (or part thereof) is pulled backwards within the apparatus 110. To address this problem, the preferred embodiment of FIGS. 7a, 7b, 8 and 9 has a sensor 181 (see FIG. 7a) which is mounted just before the head assembly 118. The sensor 181 is connected in a conventional fashion to a conventional clutch 183 preferably mounted on the head drive shaft 130. Preferably, the clutch 183 separates the head drive shaft 130 into two sections 185, 187, the latter of which is driven by the head drive chain 133 in substantially the same manner as described in the first preferred embodiment above. The first section 185 of the head drive shaft 130 is engaged with the second driving section 187 only when the clutch 183 is activated by the sensor 181. When the sensor 181 detects meat approaching the head assembly 118, it sends a signal to the clutch 183 to engage the sections 185, 187 of the head drive shaft 130 together. The head drive shaft 130 then drives the pin bone wheel 164 in preparation for de-boning operations. Just before the end (e.g., tail) of the meat passes the head assembly 118, the sensor 181 sends a signal to the clutch 183 to disengage the sections 185, 187 of the head drive shaft 130. This stops the pin bone wheel 164 from turning, and permits the remainder of the meat to pass the head assembly 118 substantially unaffected.

It will be appreciated by one having ordinary skill in the art that the sensor 181 can be of several conventional types, including motion, proximity, and mechanical sensors. In the embodiment described above, a mechanical lever-type switch is preferred due to the wet operating conditions of the apparatus 110 and the rinsing water spray from sprayers (not shown) mounted in various locations within the apparatus 110. When the meat approaching the head assembly 118 passes beneath the lever of the sensor 181 shown in FIG. 7*a*, the lever pivots to detect the presence of the meat on the conveyor belt 142. Once the meat has passed the lever of the sensor 181, it falls back to its place beside the conveyor belt 142 in a position where no meat is detected. Also, the particular location at which the meat is detected can be altered by changing the placement, orientation, and number of the sensors 181 used. This permits a user to adjust how much in advance of the meat the clutch 183 engages the head drive shaft 130 and at what position on the meat being de-boned the clutch 183 is to disengage and cease de-boning.

Figure 1A:
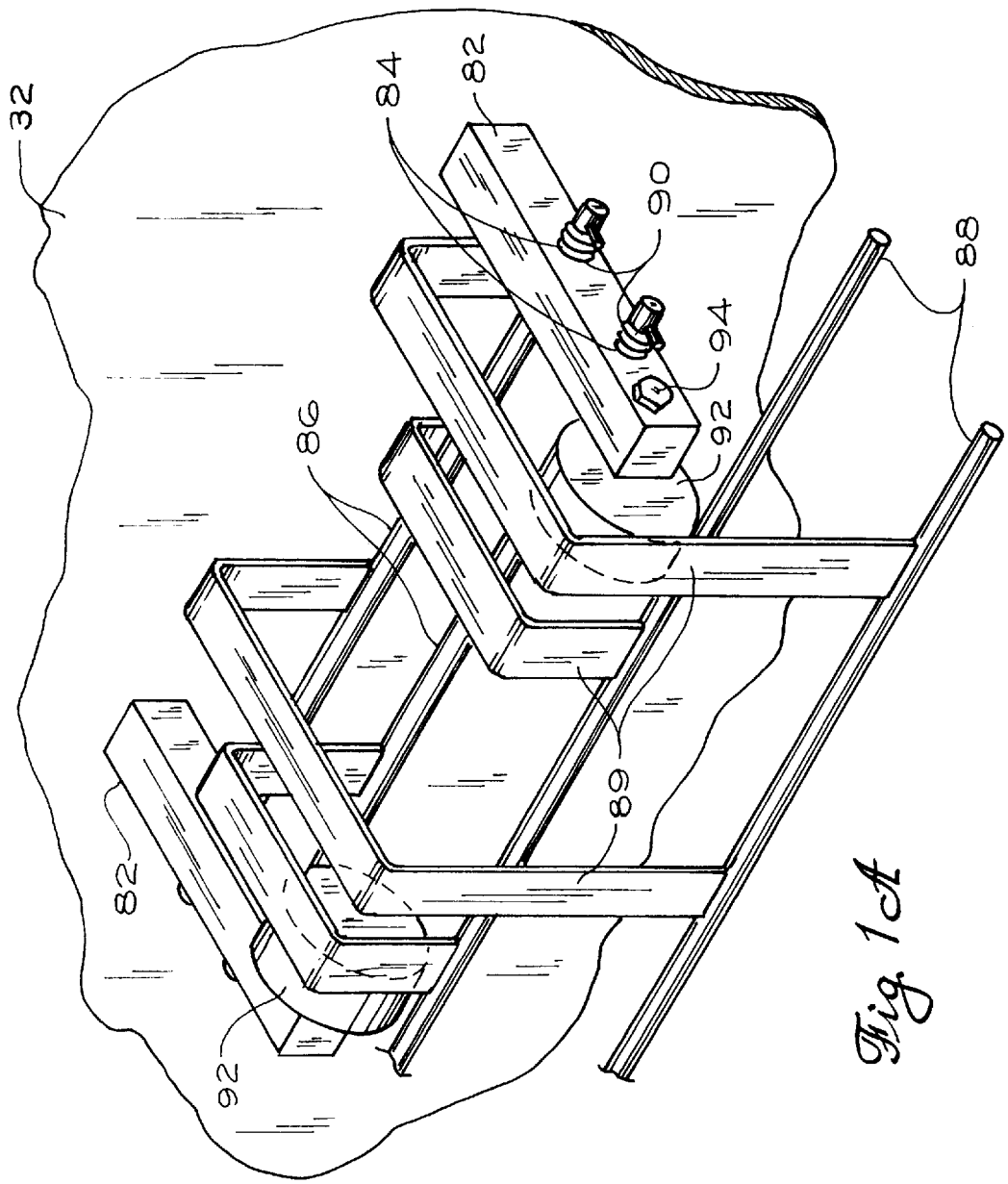
FIG. 1a is a detail view of the rail assembly shown in FIG. 1.

With reference back to the first preferred embodiment of the present invention shown in FIGS. 1–6, the de-boning apparatus 10 of the present invention is preferably provided with two rail assemblies 14, 16 which will now be described in greater detail. With particular reference to FIG. 1 and 1*a*, each rail assembly 14, 16 preferably is mounted to the frame plate 32 via studs 82, each of which preferably has a threaded hole (not shown) in its end. Bolts (also not shown) are preferably passed through appropriately located holes within the frame plate 32 and into the threaded holes within the studs 82 to secure the studs 82 to the frame plate 32. Each stud 82 preferably has two through holes 84 therein through which torque rods 86 are passed. The torque rods 86 can be capped to prevent the torque rods 86 from sliding out of their places within the through holes 84 of the studs 82. A rail member 88 is attached to each torque rod 86 preferably via at least one bracket 89, which preferably positions the rail member 88 alongside at least part of the travel path of the conveyor belt 42. The purpose of the rail members 88 being attached to the frame plate 32 in this manner is to permit each rail member 88 to be pivoted around its respective torque rod 86 away from the conveyor belt 42. However, each rail member 88 is preferably biased by a torsion spring 90 fitted between the capped end of each torque rod 86 and the stud 82 through which the torque rod 86 passes. The rail members 88 are biased by the torsion springs 90 to positions alongside the conveyor belt 42. To ensure that there exists clearance between the rail members 88 and the conveyor belt 42, each rail member 88 is preferably stopped by one or more limit members 92 which are preferably attached to the studs 82 via bolts 94 passed through the studs 82 and into the limit members 92. Therefore, each rail member 88 is normally biased by a torsion spring 90 to an at-rest position against at least one limit member 92, but can be pushed away (against the force of the torsion spring 90) from the at-rest position beside the conveyor belt 42.

For purposes which will be discussed below with regard to the operation of the present invention, it may be desired to adjust the at-rest positions of the rail members 88 to different distances from the conveyor belt 42. This operation can be performed in a number of different manners, two of which are described herein by way of example. First, the location of the entire rail assembly 14, 16 can be adjusted by providing slotted holes in the frame plate 32 through which the bolts securing the studs 82 in place are passed. By using slotted holes in the frame plate 32, a user can loosen the bolts securing the studs 82 in place, shift the entire rail assembly 14, 16 within the slotted holes, and tighten the bolts to re-secure the studs 82 in place. Alternately, the at-rest positions of the rail members 88 can be moved by adjusting the limit members 92. Specifically, (and with particular reference to FIG. 1*a*), the bolts 94 which secure the limit members 92 to the studs 82 need not pass through a centrally located hole in the limit members 92. Instead, the bolts 94 can pass through off-center holes in the limit members 92. In this way, the rotational position of the limit members 92 when they are secured in place on the studs 82 will determine where the at-rest position is for the rail members 88. A user can adjust the at-rest position of the rail members 88 beside the conveyor belt 42 by loosening the bolts 94, rotating the limit members 92, and then tightening the bolts 94 again.

The various parts of the head assembly 18 and the rail assemblies 14, 16 can be made of a number of different materials, including metal, wood, ceramics, stone, glass, composites, plastics, fiberglass, etc. However, and with exception to the head block 58, these parts are preferably made of metal and most preferably, of a high strength light weight metal such as aluminum. The head block 58 is preferably made from a low-wear material such as an engineered plastic, thereby permitting long life of the head block 58 as it is gradually worn down from passing meat. In any case, the selected material(s) for each of the elements of the head assembly 18, the rail assemblies 14, 16, and the conveyor assembly 12 are preferably of a type which is easily cleaned.

It will be appreciated by one having ordinary skill in the art that a number of different elements and assemblies can accomplish the same adjustability function as the rail assemblies 14, 16 described above and illustrated in the figures (i.e., adjusting the at-rest position of the rail members 88 beside the conveyor belt 42). For example, the rail assemblies 14, 16 can be adjusted by tightening or loosening screws passed through the rail members 88 and pressed against abutments (not shown) extending from the frame plate 32, by providing adjustable mechanical stops on or beside the torque rods 86 to prevent the torque rods 86 from rotating beyond a certain (adjustable) rotational position, etc. Such other elements and systems are well-known to those skilled in the art and are therefore not discussed further herein. Of course, although adjustability is preferred, the at-rest positions of the rail members 88 need not be adjustable at all.

It sill also be appreciated by one having ordinary skill in the art that the manner in which the rail members 88 are supported and biased in their at-rest positions alongside the conveyor belt 42 can vary significantly. For example, the studs 82 need not necessarily be attached to the frame plate 32 by bolts. Instead, the studs can be attached via a number of different fasteners, either adjustable or non-adjustable, such as by screws, nails, welds, glue, etc. As another example, the torsion springs 90 can be replaced by a number of other elements which exert a biasing force upon the rail members 88 toward a position alongside the conveyor belt 42. Such other elements include other types of springs (e.g., tension, leaf, spiral, cantilever, etc.) attached to exert a biasing force against the rail members 88 (e.g., attached between the rail members 88 and the frame plate 32), a cam which rides upon the underside of the rail members 88 and which is biased to push the rail members 88 to their at-rest positions, etc. Even the particular preferred arrangement of the rail assemblies 14, 16 described above and illustrated in the drawings can be replaced with a number of different structures all acting to position and bias rail members 88 or similar elements in one position alongside the conveyor belt 42 and in another position under force away from the conveyor belt 42. Such alternate structures, including brushes, rollers, or sliding blocks, etc. mounted beside the conveyor belt 42 are well-known to those having ordinary skill in the art, and are therefore not described in further detail herein.

The operation of the system according to the present invention will now be discussed with reference to pin de-boning operations upon fish. However, it should be noted that although fish and pin bone removal is described herein, the present invention can be used for bone, quill, rib and similar object removal from many other animal types. Although the reference numerals used hereafter refer to the preferred embodiment of the present invention described above and illustrated in FIGS. 1–6, it should be noted that the operations described apply equally to the preferred embodiment of FIGS. 7–9.

The present invention is operated by starting the apparatus motor 24 and adjusting it to a preferred speed. The preferred speed will depend largely upon the desired thoroughness of pin bone removal, the fish size and temperature, and the length of time passed since the fish was killed. Typically, colder fish and fish which are recently killed and cold stored (e.g. for less than 48 hours) are more difficult to perform pin bone removal operations on than warmer fish and fish which have been dead for two or more days. For a conveyor drum 38 diameter of 11.75" and a pin bone wheel 64 diameter of 2.187", a conveyor drum 38 speed of 10 rpm and a pin bone wheel 64 speed of 135 rpm is generally preferred to remove pin bones from approximately 12" fish fillets of fish killed and cold-stored for three days. For the same system, lower drum and wheel speeds are preferred to de-bone 12" fish fillets of fish killed and stored for two days (e.g., a conveyor drum 38 speed of 5 rpm and a pin bone wheel 64 speed of 67 rpm).

Fish fillets are preferably placed on their sides and lengthwise along the conveyor belt 42 upstream of the conveyor drum 38 by a user or another conveyor, transport, or other device. To ensure that the fish fillets are fully supported when placed upon the conveyor belt 42, the apparatus 110 (referring to the preferred embodiment shown in FIG. 7a) preferably has a bed plate 193 which extends beneath the conveyor belt 42 along its upper stretch. The bed plate 193 preferably has a curved forked end to permit the bed plate 193 to extend on either side of the conveyor drum 138. This provides further support for the fish as they approach and pass the head assembly 118. The bed plate 193 also preferably has arms 195 which are secured in a conventional manner about bearings 197 on the conveyor drive shaft 128.

With reference back to the preferred embodiment of the present invention shown in FIGS. 1–6, the conveyor belt 42 carries the fish to a position between the conveyor drum 38 and the rail member 88 of the top rail assembly 14. The fish is then guided by the rail members 88 along the circumference of the conveyor drum 38 and is gently held against the conveyor belt 42 by the rail members 88. The spring-biased rail members 88 pivot about the torque rods 86 to permit the fish to pass between the conveyor drum 38 and the conveyor belt 42. The spring-biased rail members 88 pivot more or less depending upon the size of the passing fish. After the fish has passed the upper rail assembly 14, the torsion springs 90 bias the rail members 88 back to their at-rest positions alongside the conveyor belt 42.

It should be noted that the uneven surface of the conveyor belt 42 and the surface of the fish (which is generally rough in a direction from the tail toward the head of the fish) act upon each other to grip the fish to the conveyor belt 42, particularly when the fish is upon a curved location on the conveyor belt 42. Therefore, the rail assemblies 14, 16 act more to guide the fish in its movement on the conveyor belt 42 rather than to press and hold the fish upon the conveyor belt 42.

Just downstream of the upper rail assembly 14 is the head assembly 18. Fish being conveyed around the conveyor drum 38 first encounter and pass beneath the rotating pin bone wheel 64. Specifically, and as best shown in FIG. 6, the fish are conveyed between the pin bone wheel 64 and the conveyor belt 42. Due to the curved nature of the conveyor drum 38, the fish are bowed at this point, thereby better exposing the pin bones to the pin bone wheel 64. As the fish pass beneath the rotating pin bone wheel 64 and the adjacent head block 58, the ends of the exposed pin bones pass and are caught between the teeth 96 of the pin bone wheel 64 and the lip 98 of the head block 58, which is defined by the curved surface of the head block 58 matching the outer curved surface of the pin bone wheel 64. The pin bone wheel has at least one (and preferably, a number of) teeth along its outer circumference. Further rotation of the pin bone wheel 64 and the conveyor drum 38 causes the pin bones to be pulled out of the fish and between the head block 58 and the rotating pin bone wheel 64. To ensure that the teeth 96 of the pin bone wheel 64 do not shear off the tops of the pin bones, the edges of the teeth 96 are radiused, beveled, or smoothed to more evenly distribute the pinching force exerted by the pin bone wheel teeth 96 against the pin bones. Additionally, testing of the apparatus 10 shows that small grooves or channels 99 (see FIG. 5) on the tops of the teeth 96 greatly improve the ability of the pin bone wheel 64 to grip and pull the pin bones from the fish. Preferably, and for this purpose, at least one (and most preferably, all) of the teeth have two or more grooves or channels 99 running longitudinally along the tooth length.

Further rotation of the pin bone wheel 64 brings the pin bones out of the narrow space between the pin bone wheel 64 and the head block 58, at which time the pin bones are discarded in a conventional manner (e.g., by a vacuum port (not shown) alongside the pin bone wheel 64, by a water or air jet impacting the side of the pin bone wheel 64, etc.).

As the pin bone wheel 64 is turned by the pin bone wheel sprocket 68 and the head assembly chain 72, the pulling force exerted by the pin bone wheel 64 pulling the pin bones from the fish causes the head assembly 18 to pivot about the head drive shaft 30 (described above). This torque reaction causes the pin bone wheel 64 and the head block 58 to press against the passing fish, thereby ensuring proper pressure for better channeling of the exposed pin bones to the nip position between the pin bone wheel 64 and the lip 98 of the head block 58. This pivoting and pressure application is therefore automatic and does not require the need for a separate electronic or mechanical system to provide appropriate pressure and contact of the head assembly 18 against the fish being de-boned. By avoiding the use of blades and by instead removing the pin bones by pinching the pin bones in the manner just described, significant meat savings can be realized from the present invention.

Where necessary, one or more springs (not shown) can be employed to properly balance the head assembly 18 about the head drive shaft 30. For example, a tension spring can be secured between a pin bone wheel arm 60, 62 and the frame plate 32 to exert a gentle pulling force upon the head assembly 18 away from the conveyor belt 42. This force is preferably exerted when the head assembly 18 is pivoted toward the conveyor drum 38 to prevent the head assembly 18 from pressing too hard against the passing meat. As another example, a thin leaf spring (also not shown) can be mounted on the frame plate 32 to exert a gentle pressure against the head block 58 away from the conveyor drum 38 for the same purpose. Other biasing means well known to those skilled in the art can also be used to properly orient the head assembly 18 and to prevent excessive pressure of the head assembly 18 upon meat being processed.

After the fish has been conveyed past the head assembly 18, the fish enters into the space between the conveyor drum 38 and the lower rail assembly 16. Like the upper rail assembly 14, the rail members 88 of the lower rail assembly 16 pivot about the torque rods 86 to permit adequate clearance of the fish between the rail members 88 and the conveyor belt 42 on the conveyor drum 38. The fish is thereby held against the conveyor belt 42 by the spring-biased force on the rail members 88, and is conveyed around the underside of the conveyor drum 38 until it exits the de-boning apparatus 10 at the end of the lower rail assembly 16. The fish can then be carried or conveyed by downstream equipment to the next processing stage.

In order to optimize the operation of the present invention for the various sizes of fish being conveyed through the de-boning apparatus 10, the proximity of the head assembly 18 to the conveyor belt 42 and the proximity of the rail assemblies 14, 16 and the rail members 88 to the conveyor belt 42 can be adjusted as described in detail above. The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

For example, although the present invention is described above and illustrated in the drawings as having a conveyor belt 42 passed around an idler wheel 40 and a conveyor drum 38, the present invention can be practiced on virtually any conveying surface shape. The head assembly 18 need not necessarily be located alongside a conveyor belt upon a roll. Instead, the head assembly 18 can be installed at almost any position beside which fish are conveyed (such as beside a flat conveyor belt), although the curved conveyor belt section beside the head assembly 18 described above and illustrated in the drawings is preferred because it creates greater exposure of the pin bones in the fish. Additionally, even though the de-boning apparatus 10 of the preferred embodiments employs an idler wheel 40, such is not necessary to practice the present invention. In fact, it is possible to replace the idler wheel 40 and the conveyor belt 42 with only the conveyor drum 38 covered or enclosed within a suitable low-slip low-wear material for conveying the fish. In such an embodiment, the fish are preferably fed directly to a point between the rail members 88 of the upper rail assembly 14 and the conveyor drum 38 which, like the conveyor belt 42 of the preferred embodiment, acts as a conveying element for the fish. Later processing in this system would continue as described above with regard to the preferred embodiments of the present invention. With the above examples in mind, it can be seen that the present invention is independent of the particular conveyance system and shape employed.

In any of the above-described conveyance systems, it is also possible to temporarily freeze the fish upon the conveyor belt 42 or conveyor drum 38 prior to pin boning operations. Specifically, the fish, conveyor belt 42, and/or conveyor drum 38 can be cooled in any conventional manner or be passed through a freezing zone in the path of the fish ahead of the pin bone wheel 64. The fish can thereby be frozen to the conveyor belt 42 or conveyor drum 38 prior to passing the pin bone wheel 64. This permits the fish to be more securely held during pin bone operations. After passing the pin bone wheel 64, the fish, conveyor belt 42, and/or conveyor drum 38 can be heated in any conventional manner or be passed through a heating zone in the path of the fish downstream of the pin bone wheel 64. The fish can thereby be released from the conveyor belt 42 or conveyor drum 38 for transport to downstream equipment.

Also, it will be appreciated by one having ordinary skill in the art that the particular drive systems (the conveyor drive system 20 and the head drive system 22) described above and illustrated in the drawings are only representative examples of the various drive systems possible in the present invention. Numerous conventional alternative power generation and power transmission devices and equipment can instead be used to achieve the same or similar results of the systems disclosed herein. For example, where separate motors are used to drive the conveyor drive shaft 28 and the head drive shaft 30, respectively, it is possible to provide for independent speed adjustability of the conveyor assembly 12 and the head assembly 18. This adjustability can be a valuable feature where the apparatus 10 is used for de-boning a number of different meat types each of which are best de-boned at different relative assembly speeds.

Finally, it will be appreciated by one having ordinary skill in the art that the particular head assemblies 18, 118 described above and illustrated in the drawings are only representative examples, though preferred, of the various ways in which the pin bone wheel 64, 164 and the head block 58, 158 can be moved toward and away from the conveyor belt 42 in a number of different orientations. As suggested above, depending upon the simplicity of the design desired, it is possible to substitute two or more elements of the head assembly 18, 118 with one element. For example, though the adjustment plates 52, 54, backplate 56, head block 58, and pin bone wheel arms 60, 62 are each separate and connected to one another in the first preferred embodiment described above, two or more of these elements can be combined into one element for the sake of a simpler design (but sacrificing adjustability of the head unit 18 as described above). In fact, it is even possible to make all of these elements into one carriage-like element rotatably holding the pin bone wheel 64 and preferably made from the same material as the head block 58 of the preferred embodiments described above.

In another variant of the present invention, the pivoting feature of the head assembly 18, 118 is disposed of. In particular, the entire head assembly 18, 118 is secured beside the conveyor belt 42 in a fixed position. Such a de-boning apparatus design is best suited for systems processing the same sized matter or in systems not requiring the adjustable and pivoting features of the preferred embodiments. In such a system, the head drive shaft 30, 130 can even directly drive the pin bone wheel 64, 164 without the need for a head drive shaft sprocket 66, 166, a head assembly chain 72, 172, or a pin bone wheel sprocket 68, 168. Other embodiments of the head assembly 18, 118 can employ different elements and systems to move the pin bone wheel 64, 164 and the head block 58, 158 in relation to the conveyor belt 42, 142. For example, the head block 58, 158 and the pin bone wheel 64, 164 (connected, for example, by the pin bone wheel arms 60, 62, 160, 162 in a manner similar to the preferred embodiments described above) can be moved by one or more actuators into and out of operational pin bone removal position. The actuators can be controlled manually or by a controller which is updated by one or more motion or proximity sensors with the location and/or dimensions of product on the conveyor belt 42. Alternately, the head block 58, 158 and the pin bone wheel 64, 164 can be fixed to a turntable which rotates the head block 58, 158 and the pin bone wheel 64, 164 into and out of operational position beside the conveyor belt 42, 142.

One having ordinary skill in the art will appreciate that many different systems and elements can be employed to position the head block 58, 158 and the pin bone wheel 64, 164 into and out of operational position beside the conveyor belt 42, 142. Also, one having ordinary skill in the art will recognize that such systems can be made adjustable in many conventional ways to not only change the spatial relationship between the head block 58, 158, the pin bone wheel 64, 164, and the conveyor belt 42, 142, but to also adjust the angle at which the head block 58, 158 is inclined with respect to the conveyor belt 42, 142. Such systems and elements fall within the spirit and scope of the present invention.

It should be noted that with the number of elements in the de-boning apparatus 10 kept to a minimum (particularly in embodiments having only a conveyor drum 38 in the conveyor assembly 12 and/or having a unitary head assembly 18 as described above), substantial weight savings are realized, and the maintenance and cleaning requirements for the apparatus are kept at a minimum.

What is claimed is:

1. A de-boning apparatus comprising:
   a conveying element having a product path through which the conveying element travels;
   a pin boning wheel located beside the conveying element at a point along the product path, the pin boning wheel having an outer circumference and adapted to rotate in a direction with movement of the conveying element along the product path; and
   a head block located beside the pin boning wheel and defining a gap between at least a portion of the outer circumference of the pin boning wheel and at least a portion of the head block, the gap having a gap entrance near a circumferential location of the pin boning wheel facing the conveying element.

2. The de-boning apparatus as claimed in claim 1, wherein the conveying element is a conveyor belt passing beside the pin boning wheel and the head block.

3. The de-boning apparatus as claimed in claim 1, wherein the conveying surface presents a convex profile to the gap entrance.

4. The de-boning apparatus as claimed in claim 1, wherein the conveying surface is a conveyor belt which runs around at least a portion of a drum, the gap entrance being located at a position beside the conveyor belt behind which the drum is located.

5. The de-boning apparatus as claimed in claim 4, further comprising an idler wheel about which the conveyor belt runs, the idler wheel maintaining a desired tension upon the conveyor belt.

6. The de-boning apparatus as claimed in claim 1, wherein the pin boning wheel has a toothed profile on its outer circumference.

7. The de-boning apparatus as claimed in claim 6, wherein the toothed profile defines at least one tooth and adjacent lower section on the outer circumference of the pin boning wheel, the at least one tooth having edges which are radiused.

8. The de-boning apparatus as claimed in claim 6, wherein teeth of the pin boning wheel have at least one groove formed in a surface thereof.

9. The de-boning apparatus as claimed in claim 1, wherein the gap is defined by the portion of the outer circumference of the pin boning wheel and a portion of the head block which is curved to present a concave profile to the pin boning wheel.

10. The de-boning apparatus as claimed in claim 1, wherein the gap entrance has a width, the gap entrance width being adjustable by moving the pin boning wheel with respect to the head block.

11. The de-boning apparatus as claimed in claim 1, wherein the pin boning wheel is mounted for rotation about a pin bone wheel pivot, the pin bone wheel pivot having an eccentric bearing adjuster mounted thereon for adjusting the distance between the pin boning wheel and the head block.

12. The de-boning apparatus as claimed in claim 1, wherein the gap entrance is located a distance from the conveying element, the distance being adjustable by moving the pin boning wheel and head block with respect to the conveying element.

13. The de-boning apparatus as claimed in claim 12, further comprising a head drive shaft in driving engagement with the pin boning wheel to turn the pin boning wheel, the head block being attached to the pin boning wheel and to the head drive shaft to permit head block rotation about the head drive shaft independent of head drive shaft rotation, the distance between the gap entrance and the conveying element being adjustable by rotation of the head block about the head drive shaft.

14. The de-boning apparatus as claimed in claim 1, wherein the head block has a lip defining one side of the gap entrance, the lip being positioned at an adjustable angle with respect to the conveying element.

15. The de-boning apparatus as claimed in claim 1, further comprising at least one rail assembly located beside the conveying element, the rail assembly including at least one rail running alongside and disposed a distance from a surface of the conveying element.

16. The de-boning apparatus as claimed in claim 15, wherein the at least one rail is movable from an at-rest position beside the conveying element to a position more removed from the conveying element, the rail assembly further comprising a spring biased to hold the at least one rail in the at-rest position beside the conveying element.

17. The de-boning apparatus as claimed in claim 1, further comprising:
   a head drive shaft in driving engagement with the pin boning wheel to turn the pin boning wheel, and
   a clutch coupled to the head drive shaft, the clutch having a first position in which the head drive shaft is engaged and turns the pin boning wheel and having a second position in which the drive shaft is disengaged and does not turn the pin boning wheel.

18. The de-boning apparatus as claimed in claim 17, further comprising a sensor coupled to and in controlling relationship with the clutch and located to detect the presence of material upon the conveying element.

19. An apparatus for removing bones from meat product, comprising:
   a pin bone wheel mounted for rotation about an axis and having a circumferential surface;
   a head block having a surface disposed adjacent a circumferential portion of the pin bone wheel and in facing relationship with the circumferential surface of the pin bone wheel to define a gap between the head block and the circumferential surface of the pin bone wheel, the gap having an entrance and an exit; and
   a conveying surface located beside the pin bone wheel and the head block, the conveying surface spaced a distance from the pin bone wheel and the head block to permit meat product to be conveyed by the conveying surface past and in close proximity to the gap entrance.

20. The apparatus as claimed in claim 19, wherein the conveying surface is a conveyor belt adapted to support the meat product and convey the meat product to and past the gap entrance.

21. The apparatus as claimed in claim 19, wherein the conveying surface presents a convex profile to the gap entrance.

22. The apparatus as claimed in claim 21, wherein the conveying surface is a belt supported and rotated by a conveyor drum, the conveyor drum having a round cross section which creates the convex profile of the belt.

23. The apparatus as claimed in claim 21, wherein the conveying surface is a conveyor drum.

24. The apparatus as claimed in claim 19, further comprising an idler wheel over about which the conveying surface is run to maintain tension on the conveying surface.

25. The apparatus as claimed in claim 19, wherein the pin bone wheel has a plurality of teeth located upon the circumferential surface, the teeth being spaced apart from one another to define a plurality of gaps between the teeth.

26. The apparatus as claimed in claim 25, wherein the teeth have rounded edges.

27. The apparatus as claimed in claim 25, wherein the teeth have grooves formed in the surface thereof, the grooves running longitudinally along a length of the teeth.

28. The apparatus as claimed in claim 19, wherein the surface of the head block facing the circumferential surface of the pin bone wheel is concave to follow a portion of the circumferential surface of the pin bone wheel.

29. The apparatus as claimed in claim 19, wherein the gap entrance has a width and wherein the pin bone wheel rotates about a pin bone wheel pivot, the pin bone wheel pivot being adjustable to change the location of the axis of the pin bone wheel and to thereby change the gap entrance width.

30. The apparatus as claimed in claim 19, wherein the pin bone wheel and the head block are attached to one another and wherein the location of the pin bone wheel and the head block is adjustable to change the distance between the conveying surface and the pin bone wheel and head block.

31. The apparatus as claimed in claim 19, wherein the pin bone wheel and the head block are adapted for pivotal rotation about an axis disposed from the axis of the pin bone wheel, the distance between the conveying surface and the pin bone wheel and head block being adjustable within a range of positions corresponding to a pivot range of the pin bone wheel and the head block.

32. The apparatus as claimed in claim 19, wherein head block has a rotational orientation with respect to the conveying surface, the rotational orientation being adjustable to place the gap entrance in a number of different angular orientations with respect to the conveying surface.

33. The apparatus as claimed in claim 19, wherein the conveying surface has at least one rail secured a distance from conveying surface, the at least one rail being adjustable to change the distance according to the meat product being fed into the apparatus.

34. The apparatus as claimed in claim 33, wherein the at least one rail has a biasing mechanism to bias the at least one rail toward an at-rest position beside the conveying surface, the biasing mechanism permitting the at least one rail to move away from the at-rest position when meat product is conveyed between the conveying surface and the at least one rail.

35. The apparatus as claimed in claim 19, further comprising:

a clutch in selectable driving engagement with the pin bone wheel; and a sensor coupled to the clutch for controlling clutch operation, the sensor positioned to detect meat product location on the conveying surface, the sensor adapted to control the clutch based upon the location of meat product detected on the conveying surface.

36. A method for removing bones from meat product, including the steps of:

providing a conveying surface upon which the meat product is conveyed;

providing a pin bone wheel adjacent to the conveying surface;

providing a head block adjacent and in spaced relationship to the pin bone wheel to define a gap therebetween, the gap having a gap entrance;

conveying the meat product via the conveyor to a position beside the gap entrance; and rotating the pin bone wheel to pull bones from the meat product through the gap entrance and into the gap as the meat product is conveyed with respect to the pin bone wheel and the head block.

37. The method as claimed in claim 36, wherein the conveying surface is bowed to present a convex profile to the gap entrance, the method further comprising the step of conveying the meat product to the position beside the gap entrance at which position the meat product presents a convex profile to the gap entrance.

38. The method as claimed in claim 36, wherein the pin bone wheel is toothed along an circumferential surface, the method further comprising the step of gripping the bones in the meat between the head block and teeth on the pin bone wheel as the pin bone wheel is rotated.

39. The method as claimed in claim 36, wherein the gap entrance has a gap width, the method further comprising the step of adjusting the gap width by moving the pin bone wheel with respect to the head block.

40. The method as claimed in claim 36, wherein the gap entrance is located a distance from the conveying surface, the method further comprising the step of adjusting the distance by moving the head block and the pin bone wheel with respect to the conveying surface.

41. The method as claimed in claim 36, further comprising the steps of:

detecting via a sensor the presence of meat product on a location of the conveying surface;

controlling the clutch via the sensor to rotate the pin bone wheel at a desired location of the meat product.

42. The method as claimed in claim 36, further including the step of freezing the meat product to the conveying surface prior to the step of conveying the meat product to a position beside the gap entrance.

43. The method as claimed in claim 42, further comprising the step of thawing the meat product off of the conveying surface after the step of rotating the pin bone wheel to pull bones from the meat product.

\* \* \* \* \*